T. W. BAKER & F. P. HEPDING.
COMBINED COOKING AND HEATING APPARATUS.
APPLICATION FILED APR. 12, 1913.
1,107,475.
Patented Aug. 18, 1914.
2 SHEETS—SHEET 2.
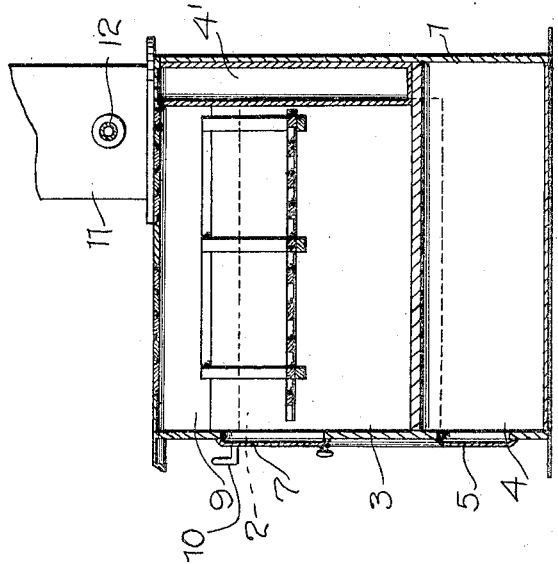
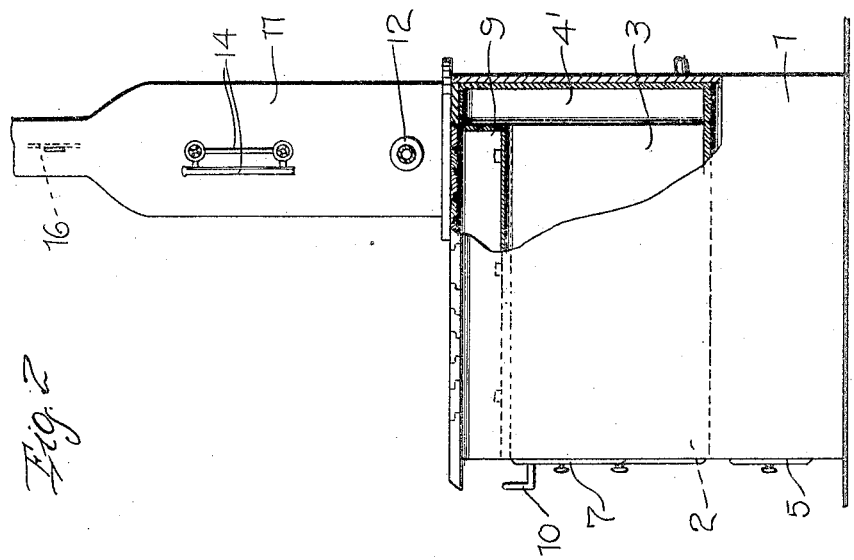
Witnesses
Robert M. Sutphen
A. D. Hind
Inventors
Thomas W. Baker
& Frederick P. Hepding
By Watson E. Coleman
Attorney

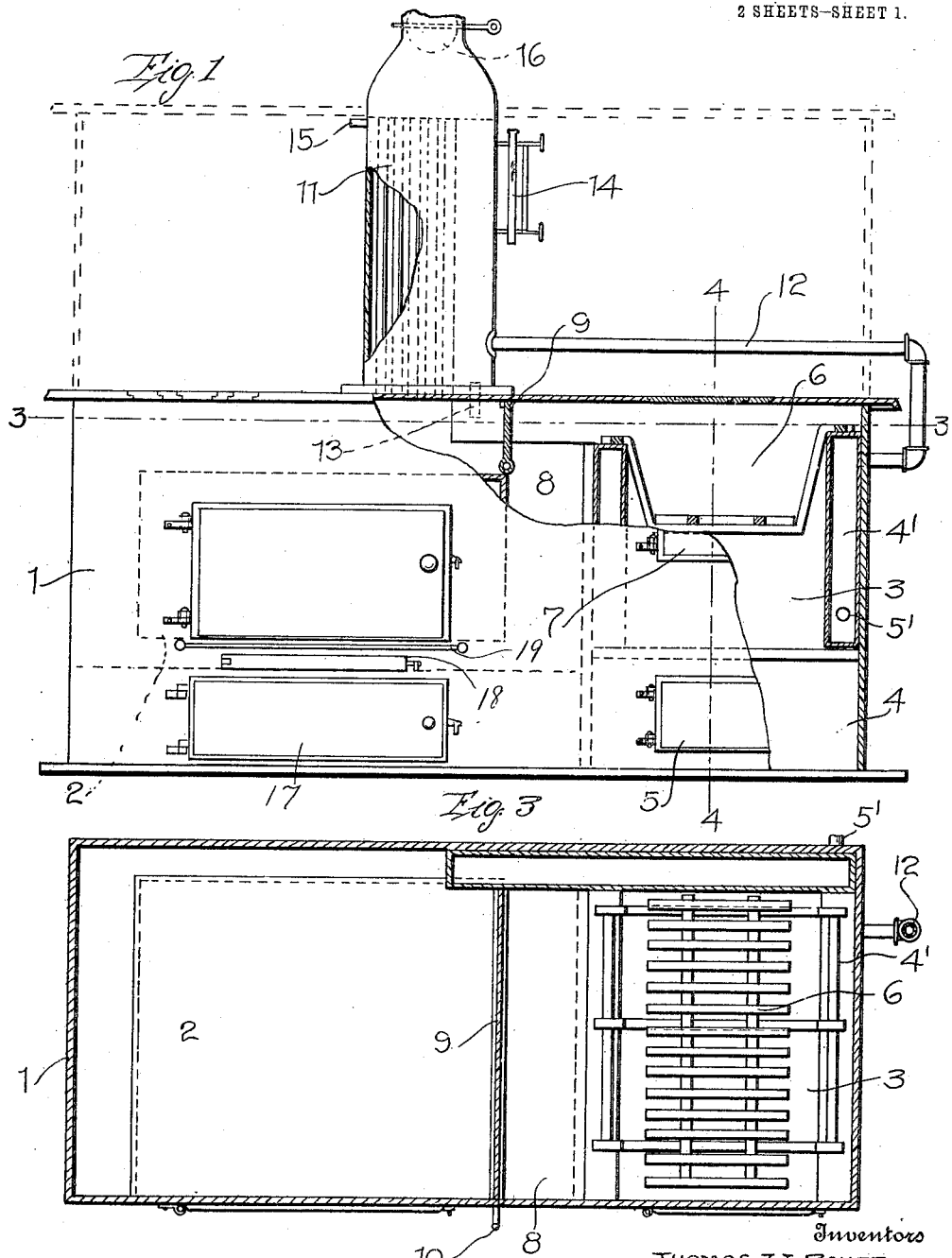

UNITED STATES PATENT OFFICE.

THOMAS W. BAKER AND FREDERICK P. HEPDING, OF CHROME, NEW JERSEY.

COMBINED COOKING AND HEATING APPARATUS.

1,107,475. Specification of Letters Patent. Patented Aug. 18, 1914.

Application filed April 12, 1913. Serial No. 760,709.

*To all whom it may concern:*

Be it known that we, THOMAS W. BAKER and FREDERICK P. HEPDING, citizens of the United States, residing at Chrome, in the county of Middlesex and State of New Jersey, have invented certain new and useful Improvements in Combined Cooking and Heating Apparatus, of which the following is a specification, reference being had to the accompanying drawings.

This invention relates to new and useful improvements in a combined cooking and heating apparatus and has for its object to provide a device of this character which will utilize the heat usually wasted from a cooking stove for use in heating water for heating purposes.

A further object of the invention resides in providing a device which will obtain a maximum amount of heat from a minimum amount of fuel, thus saving considerable expense usually attached to a heating apparatus and a still further object resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawings forming a part of this application, Figure 1 is a front elevation of my improved heating apparatus with parts broken away to show a portion of the interior of the device. Fig. 2 is an end elevation thereof with parts broken away to show the interior of the device. Fig. 3 is a horizontal section therethrough as seen on line 3—3, Fig. 1. Fig. 4 is a transverse section through the same as seen on line 4—4, Fig. 1.

In describing our invention, we shall refer to the drawings in which similar reference characters designate corresponding parts throughout the several views and in which 1 indicates an outer casing, such as is usually provided for large cooking stoves, which is provided with a bake oven 2, adjacent one end of the same and spaced from the walls of the casing. Formed in the casing 1 to one side of the bake oven 2 and adjacent the opposite end of the casing, is an enlarged fire box 3 below which is an ash pit 4 to which entrance may be had through the medium of the door 5.

Surrounding the enlarged fire box 3, is a water jacket 4' which is supplied with water from a pipe 5' leading from any source of supply (not shown). This water jacket 4' which surrounds the fire box 3 extends upwardly to points adjacent the top of the casing 1 and supported on the upper edges of this water jacket to extend downwardly into the upper portion of the enlarged fire box 3 is an auxiliary fire box 6, provided with a removable grate in the bottom thereof. An additional door 7 is provided in the front wall of the casing 1, whereby entrance may be had to said fire boxes 3 and 6, when desired.

That portion of the water jacket 4', adjacent the bake oven 2 is spaced slightly from said oven to provide a heat passage-way 8 which leads around the bottom of the oven to the opposite side thereof and upwardly over the top of said oven. This passage-way also leads directly over the top of said oven but this portion of the passage-way is obstructed by a pivoted damper 9 which is operated by a handle or the like 10 projecting beyond the front wall of the casing 1. The particular purpose of this damper will be hereinafter and more particularly set forth. It will be seen that as the heat and products of combustion rise from over the fire boxes 3 and 6, the same will pass over the wall adjacent the bake oven and downwardly into the passage-way 8. Assuming that the damper 9 is closed, said products of combustion pass below the bottom of the bake oven and then over the top of said oven to thoroughly heat the same.

Mounted on the top of the casing 1 to communicate with the interior thereof, at a point just above the oven 2, is a boiler 11, which receives the exhausted products of combustion hereabove referred to, after the same pass around the bake oven. Leading to said boiler from one portion of the water jacket 4', is a pipe or conduit 12, while an additional pipe 13 leads from another portion of said boiler to the opposite portion of the water jacket 4'. This boiler 11 is provided with a gage 14 on the one side thereof and adjacent the top of said boiler is provided a steam or hot water outlet 15. The extreme upper portion of the boiler which forms a stack and leads to a pipe is provided with an additional damper 16.

In practice, in the colder periods of the year, when it is desired to obtain the full amount of heat from a device, as well as use the same for cooking purposes, the auxiliary fire box 6 is removed and the damper 9 closed. As the heated products of combustion arise from the fire box, the same are passed downwardly through the passageway 8 and around the bake oven 2 to be exhausted through the boiler 11. It is obvious that by taking this course, the products of combustion will thoroughly heat the oven and at the same time it will be seen that the water in the water jacket 4′ and the pipes and boiler become thoroughly heated, the steam arising therefrom being exhausted through the steam outlet 15 to be used in any manner desired for heating purposes. Of course, when it is not desired to use the oven, the damper 9 may be opened and the heat in the fire box passed over the one wall of said fire-box and conducted directly to the boiler 11. In this manner, the water within said boiler will receive the products of combustion when the same have a greater amount of heat therein, and thus the water in said boiler will become heated much quicker than would be possible by the products of heat first passing around the oven. The products of combustion may be retained in said boiler to a greater or less extent by the adjustment of the damper 16. Thus this device may be used in place of the large furnaces which are now used for the purpose of heating homes and like structures. In the warmer periods of the year, however, when it is not necessary to provide heat for the structure, the auxiliary fire box 6 is used. This auxiliary fire box is, of course, much smaller than the fire box 3 and serves the purpose of heating the oven for cooking purposes and will also heat the water in the water jacket and in the boiler to a slight degree.

Disposed below the oven 2, is a storage oven for which a door 17 is provided and arranged between the door of the oven 2 and the door 17 is a cleaning out door 18. Arranged on the front face of the casing 1 of the stove immediately below the door of the oven 2, is a shelf 19, used for obvious purposes and an additional shelf is preferably provided over the stove, as shown in dotted lines in Fig. 1, to be used for various desired purposes.

From the foregoing description of the construction of my improved device, the operation thereof will be readily understood and it will be seen that we have provided a device which will supply heat for both cooking and heating purposes, thus eliminating the necessity of using separate heating furnaces and the like. It will also be seen that this device is both a labor and fuel saving apparatus.

While we have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:

A combined heating and cooking apparatus of the class described comprising a casing including front and rear and end walls and top and bottom walls, a vertical wall extending from the front to the rear wall and from the bottom wall to a point in spaced relation to the top and forming a fire box with the adjacent end wall of the casing, an oven chamber extending from the front to the rear wall and having its walls spaced from the top and bottom walls and from the partition and the other end walls, a damper pivoted at the upper corner of the oven chamber adjacent the fire box and extending from the front to the rear wall and adapted to close either the space between the adjacent portion of the oven chamber and the top of the casing or to close the space between the adjacent portion of the oven chamber and the fire box, a boiler mounted directly on the top of the casing and above the oven chamber, an air passage through said boiler communicating with the space between the oven chamber and the top of the casing adjacent the damper, said air passage forming outlet means for the products of combustion in the fire box, and a damper carried by the boiler for controlling the passage therethrough.

In testimony whereof we hereunto affix our signatures in the presence of two witnesses.

THOMAS W. BAKER.
FREDERICK P. HEPDING.

Witnesses:
JULIUS LASTEN,
HENRY T. KEMPERS.